United States Patent
Pavlopoulos (10) Patent No.: US 7,448,510 B2
(45) Date of Patent: Nov. 11, 2008

(54) CUP ASSEMBLY HAVING A COOLING COMPARTMENT

(76) Inventor: Spero Pavlopoulos, 71 Horshoe La., Lemont, IL (US) 60439

( * ) Notice: Subject to any disclaimer, the term of this patent is extended or adjusted under 35 U.S.C. 154(b) by 516 days.

(21) Appl. No.: 11/085,580

(22) Filed: Mar. 22, 2005

(65) Prior Publication Data

US 2006/0081638 A1    Apr. 20, 2006

(30) Foreign Application Priority Data

Oct. 15, 2004    (TW) .............................. 93131262 A (51) Int. Cl.
| | |
|---|---|
| *B65D 3/22* | (2006.01) |
| *B65D 8/06* | (2006.01) |
| *A47G 19/22* | (2006.01) |
| *B65D 1/40* | (2006.01) |
| *B65D 25/04* | (2006.01) |

(52) U.S. Cl. .................. 220/501; 220/502; 220/62.18; 220/713

(58) Field of Classification Search ................. 220/501, 220/502, 713, 711, 714, 719, 592.17, 253, 220/351, 506, 62.12, 62.18, 521

See application file for complete search history.

(56) References Cited

U.S. PATENT DOCUMENTS

| | | | | |
|---|---|---|---|---|
| 4,964,527 | A | * | 10/1990 | Martin ....................... 220/698 |
| 5,570,797 | A | * | 11/1996 | Yeh ............................ 215/228 |
| 5,607,076 | A | | 3/1997 | Anthony |
| 5,964,379 | A | | 10/1999 | DeMars |
| 6,010,029 | A | * | 1/2000 | Wang ......................... 220/714 |
| 6,182,854 | B1 | * | 2/2001 | Jimenez et al. ............. 220/705 |
| 6,189,725 | B1 | * | 2/2001 | Monico ...................... 220/698 |
| 6,502,715 | B2 | * | 1/2003 | Miorelli ...................... 220/719 |
| 6,571,973 | B1 | | 6/2003 | Trisianes |
| 2002/0003145 | A1 | * | 1/2002 | Milan ......................... 220/713 |
| 2006/0124645 | A1 | * | 6/2006 | Peitersen .................... 220/719 |

* cited by examiner

*Primary Examiner*—Anthony D Stashick
*Assistant Examiner*—Niki M. Eloshway
(74) *Attorney, Agent, or Firm*—Bacon & Thomas, PLLC (57) ABSTRACT

A cup assembly includes a cup (10) and a lid (20) to define therebetween a first passage and a second passage to allow a liquid cooling compartment between the lid (20) and the cup (10) to be filled with liquid contained in the cup when the first passage is clear and the second passage is blocked and the liquid in the liquid cooling compartment is able to flow out of an outlet (23) in communication with the liquid cooling compartment when the second passage is clear and the first passage is blocked.

16 Claims, 14 Drawing Sheets

CUP ASSEMBLY HAVING A COOLING COMPARTMENT

BACKGROUND OF THE INVENTION

1. Field of the Invention

The present invention relates to a cup assembly, and more particularly to the cup assembly having a cooling compartment to cool a portion of hot liquid contained in the cup body.

2. Description of Related Art

Figure 13:
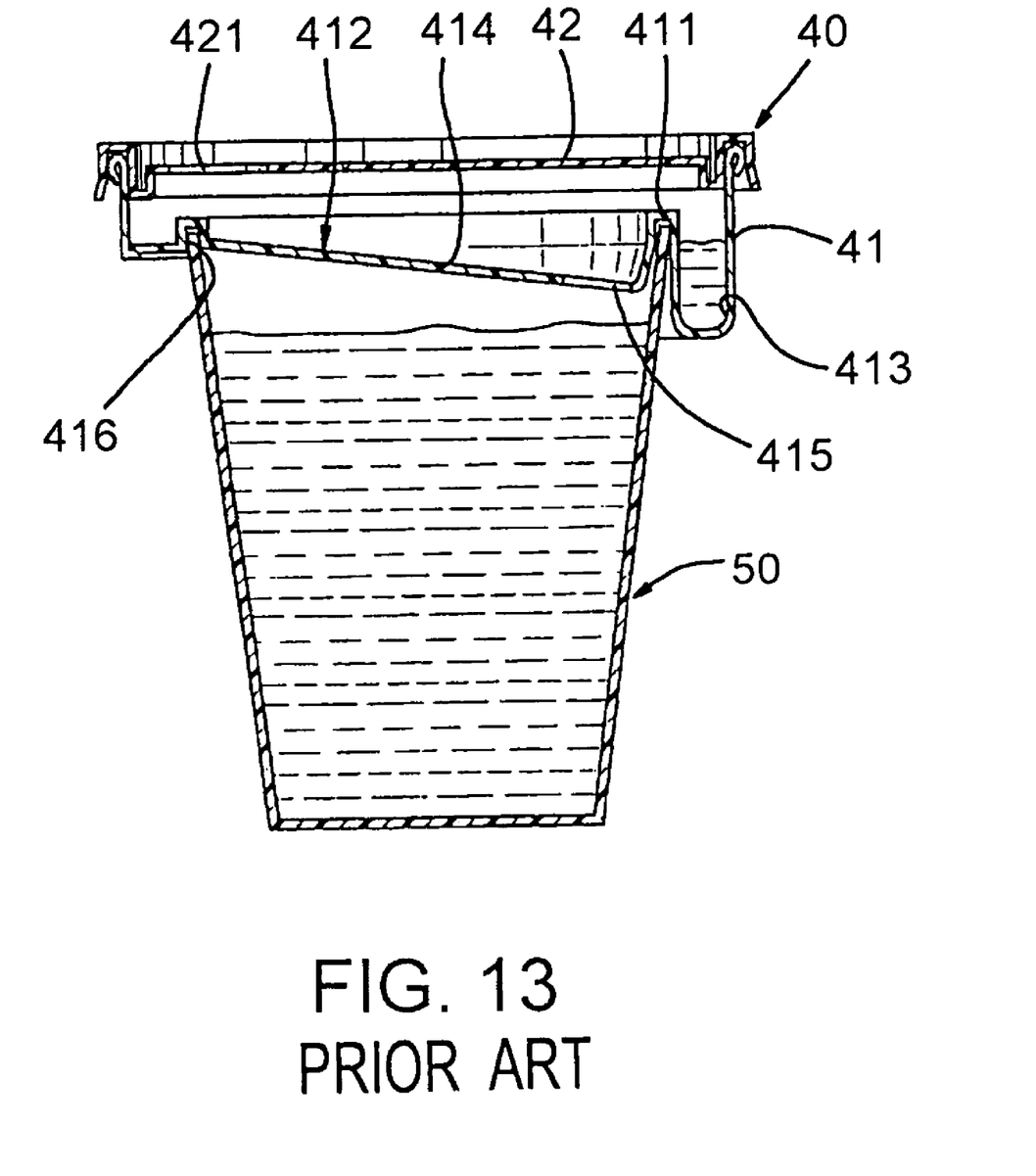
FIG. 13 is a cross sectional view showing the structure of a conventional cup assembly.

With reference to FIG. 13, U.S. Pat. No. 6,571,973 discloses a cup lid (40) which is composed of a lid seat (41) and a cover (42).

The lid seat (41) has an inclined bottom plate (414) relative to the cover (42), a first recess (411) defined in the bottom plate (414) to be mounted on a top periphery of a cup (50) and a second recess (416) defined in the bottom plate (414) to be mounted on the top periphery of the cup (50). It is noted that the first recess (411) has a height greater than that of the second recess (416) such that after the lid seat (41) is mounted on top of the cup (50), the bottom plate (414) is slanted. The cover (42) is able to be sealingly mounted on top of the lid seat (41) to define a liquid receiving space between the cover (42) and the bottom plate (414) of the lid seat (41).

Due to the first recess (411) defined in the bottom plate (414), the liquid receiving space is divided into a first chamber (412) and a second chamber (413). The bottom plate (414) further has an inlet (415) defined to communicate with an interior of the cup (50) and the first chamber (412). The cover (42) further has an outlet (421) defined through the cover (42) to communicate with the first chamber (412).

Figure 14:
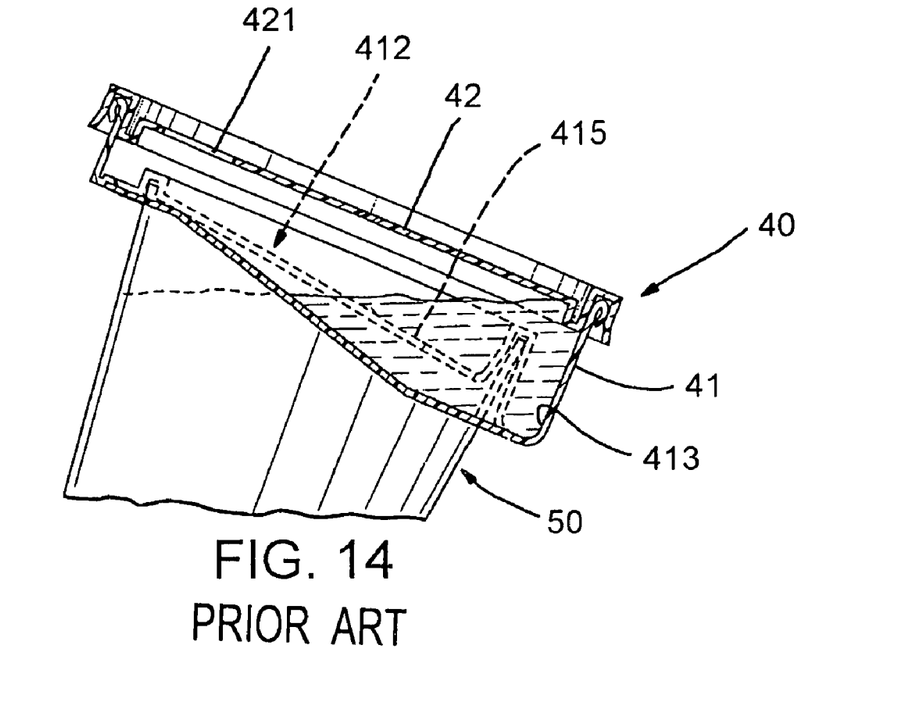
FIGS. 14 to 16 are schematic cross sectional views showing the application of the conventional cup assembly.
Figure 15:
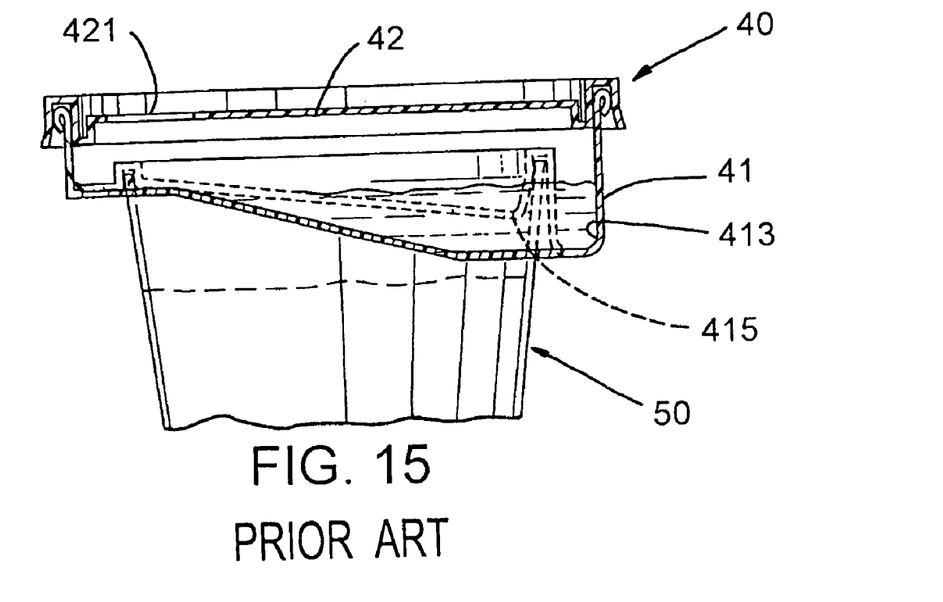
Figure 16:
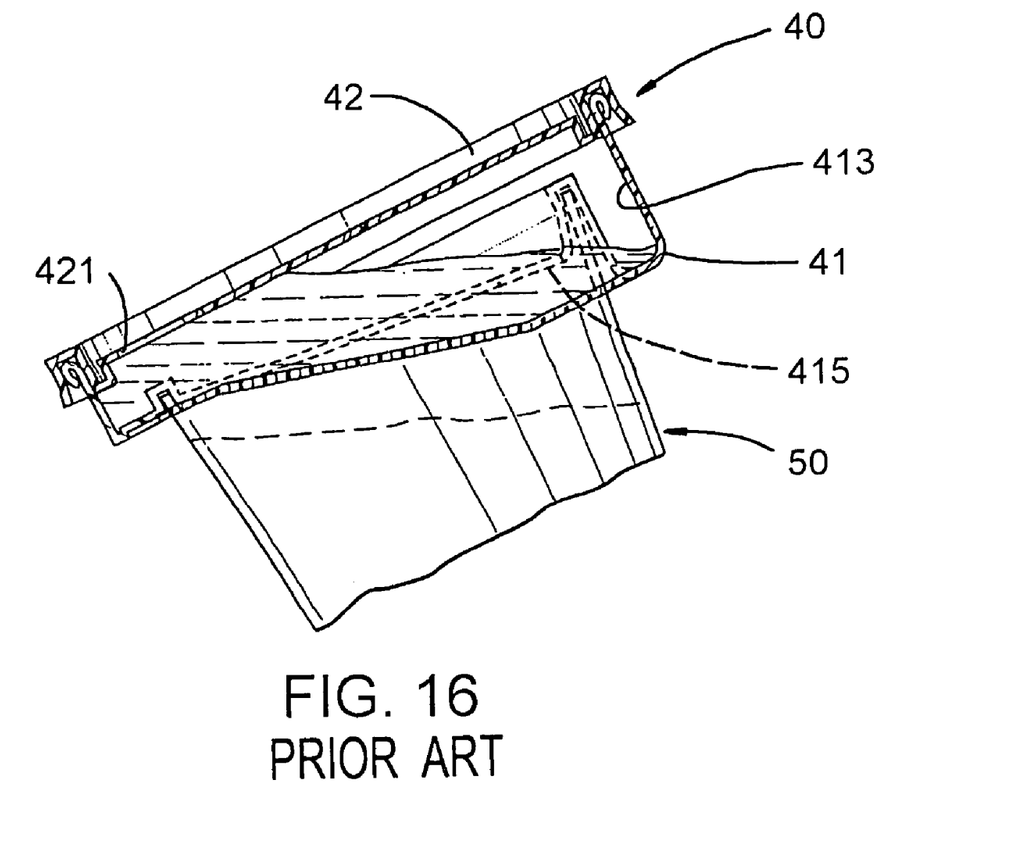

With reference to FIGS. 14, 15 and 16, when the conventional cup assembly is in use, the user is able to tilt the cup assembly to allow liquid contained in the cup (50) to flow into the first chamber (412) and the second chamber (413) from the inlet (415). Then the cup assembly is placed upright again to allow a portion of the liquid flowing into the first chamber (412) to flow back to the cup (50) and a portion of the liquid flowing into the second chamber (413) to be kept in the second chamber (413). Because a portion of the liquid flows into the second chamber (413), the area of the second chamber (413) facilitates a heat dissipation effect to the liquid in the second chamber (413). Thus the temperature of the liquid in the second chamber (413) reduces faster than that of the liquid still contained in the cup (50). Therefore, the user is able to use the outlet to sip the temperature-reduced liquid via the outlet (421) of the cover (42).

Although the conventional cup assembly does provide protection to the user to prevent mouth injury from the hot liquid in the cup (50), the user will have to adopt this two-phase process to drink the liquid even after the liquid temperature in the cup (50) has dropped to drinkable level, which is very inconvenient to the user.

To overcome the shortcomings, the present invention tends to provide an improved cup assembly to mitigate the aforementioned problems.

SUMMARY OF THE INVENTION

The primary objective of the present invention is to provide an improved cup assembly to provide two passages in the lid and the cup to allow the user to selectively choose one of the passages to communicate with a liquid cooling chamber so as to perform different functions.

Another objective of the present invention is to provide a positioning device to limit a rotation angle of the lid relative to the cup.

Other objects, advantages and novel features of the invention will become more apparent from the following detailed description when taken in conjunction with the accompanying drawings.

DETAILED DESCRIPTION OF THE PREFERRED EMBODIMENT

Figure 1:
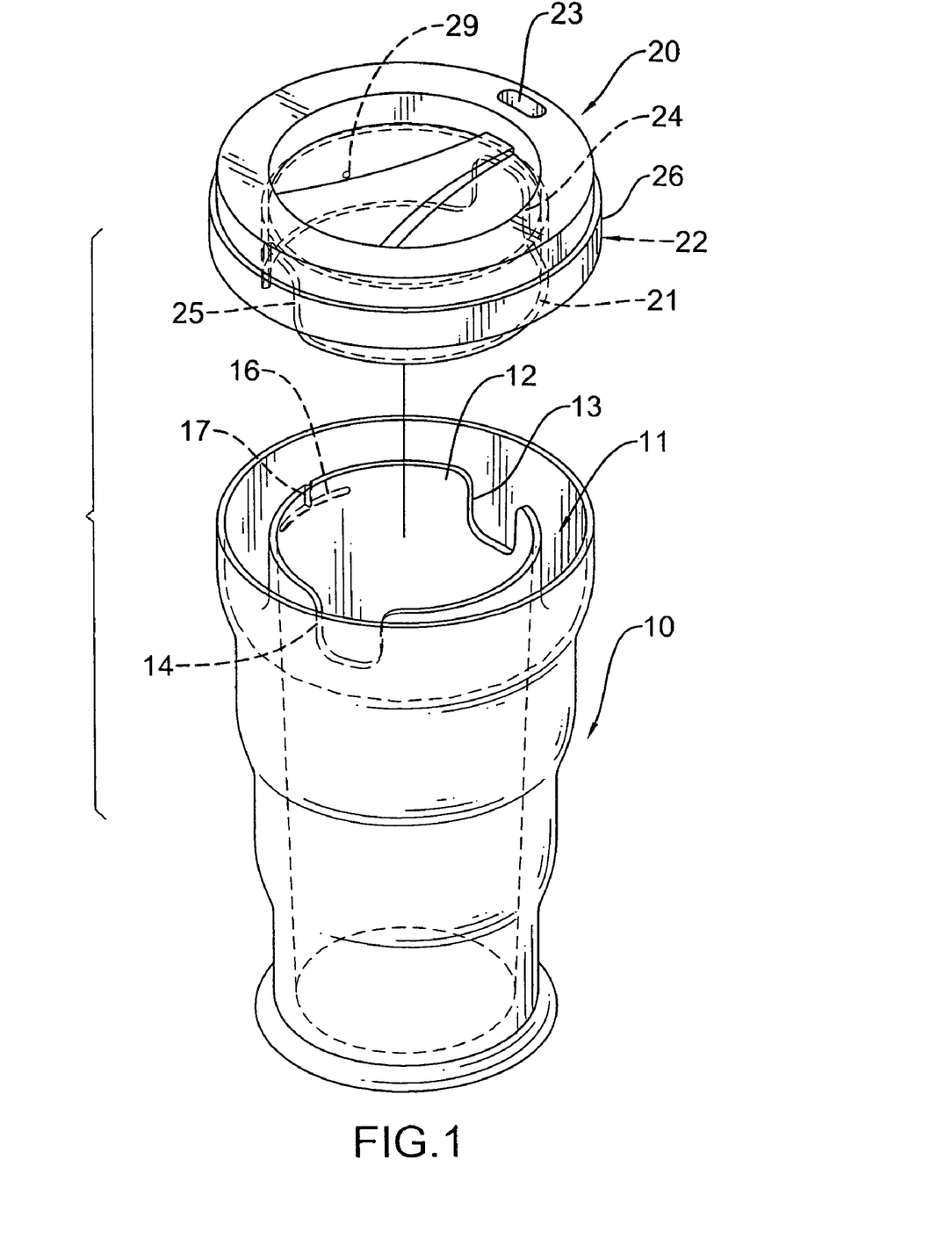
FIG. 1 is an exploded perspective view of the cup assembly of the present invention.

With reference to FIG. 1, the cup assembly in accordance with the present invention includes a cup (10) and a lid (20) which is able to be mounted on top of the cup (10) to cover the open end of the cup (10).

The cup (10) is provided with an inner wall (12) in connection with a Peripheral edge of the cup (10) to define therebetween a first chamber (11), a first cup cutout (13) and a second cup cutout (14), both the first cup cutout (13) and the second cup cutout (14) being defined in the inner wall (12). Furthermore, a longitudinal slit (17) is defined in an outer circumference of the inner wall (12) and a latitudinal slit (16) is also defined in the outer circumference of the inner wall (12) to intersect with the longitudinal slit (17).

The lid (20) includes an inner extension (21) extending from a bottom face of the lid (20) to define a second chamber (22) with an outer wall (26) which is extended from an outer periphery of the lid (20), an outlet (23) is defined through the lid (20) to communicate with the second chamber (22), a first lid cutout (24) defined in the inner extension (22) to correspond to and align with the first cup cutout (13), and a second lid cutout (25) defined in the inner extension (22) to correspond to and align with the second cup cutout (14). Furthermore, the lid (20) has a limiting element (29), such as a ball or the like, mounted on the inner extension (22) to correspond to the longitudinal slit (17) and the latitudinal slit (16).

Figure 1A:
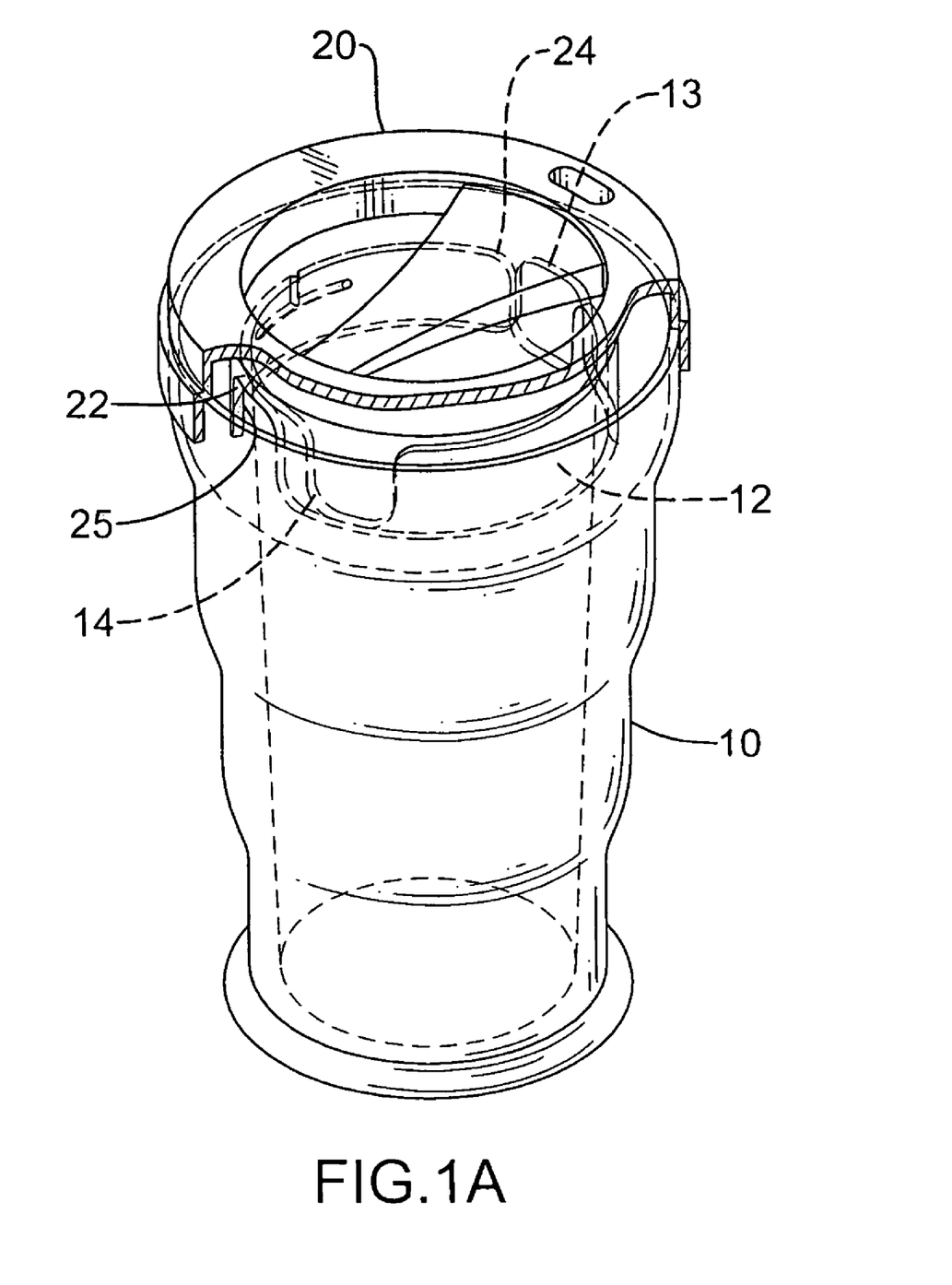
FIG. 1A is a schematic perspective view partially cross section to show the corresponding relationship among the first cup cutout, the second cup cutout, the first lid cutout and the second lid cutout of the cup assembly.
Figure 2:
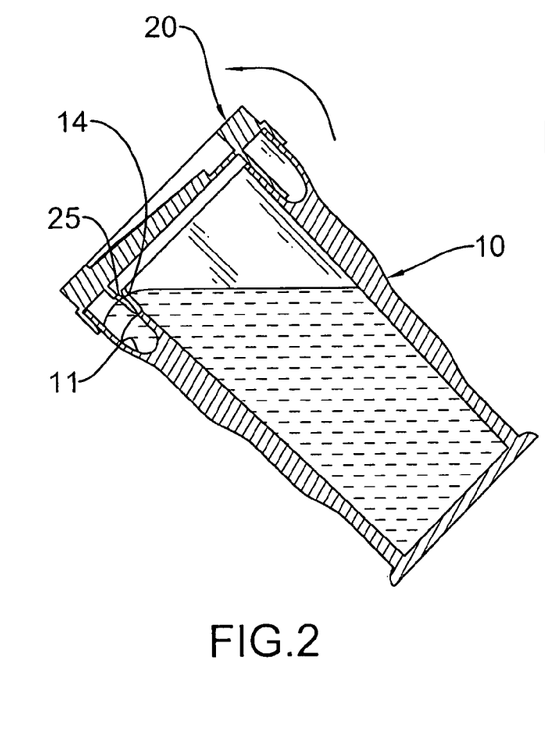
FIGS. 2, 3 and 4 are schematic views showing the application of the cup assembly of the present invention.
Figure 3:
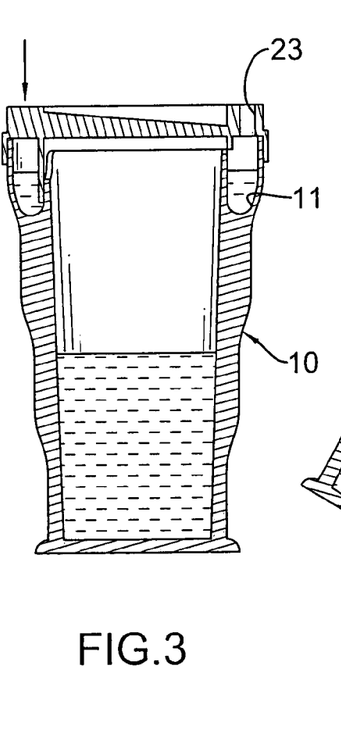

With reference to FIG. 1A, it is noted that when the lid (20) is mounted on top of the cup (20) to cover the open end of the cup (10), the first lid cutout (24) is able to selectively communicate with the first cup cutout (13) and the second lid cutout (25) is able to selectively communicate with the second cutout (14), wherein from the depiction in FIG. 1A, the first cup cutout (13) is aligned with the first lid cutout (24) and the second cup cutout (14) is not aligned with the second lid cutout (25). That is, when the third cutout (24) is communicated with the first cutout (13) to define a first passage, the communication between the fourth cutout (25) and the second cup cutout (14), which forms a second passage, is blocked by the inner extension (22) and the inner wall (12) and vice versa.

Figure 4:
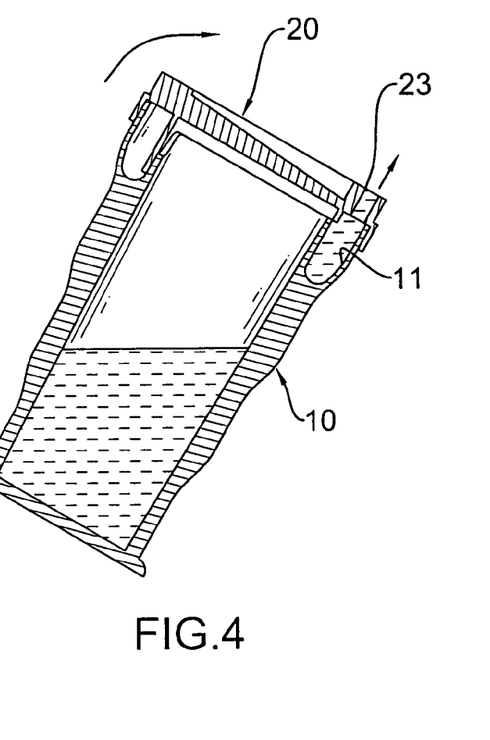
Figure 5:
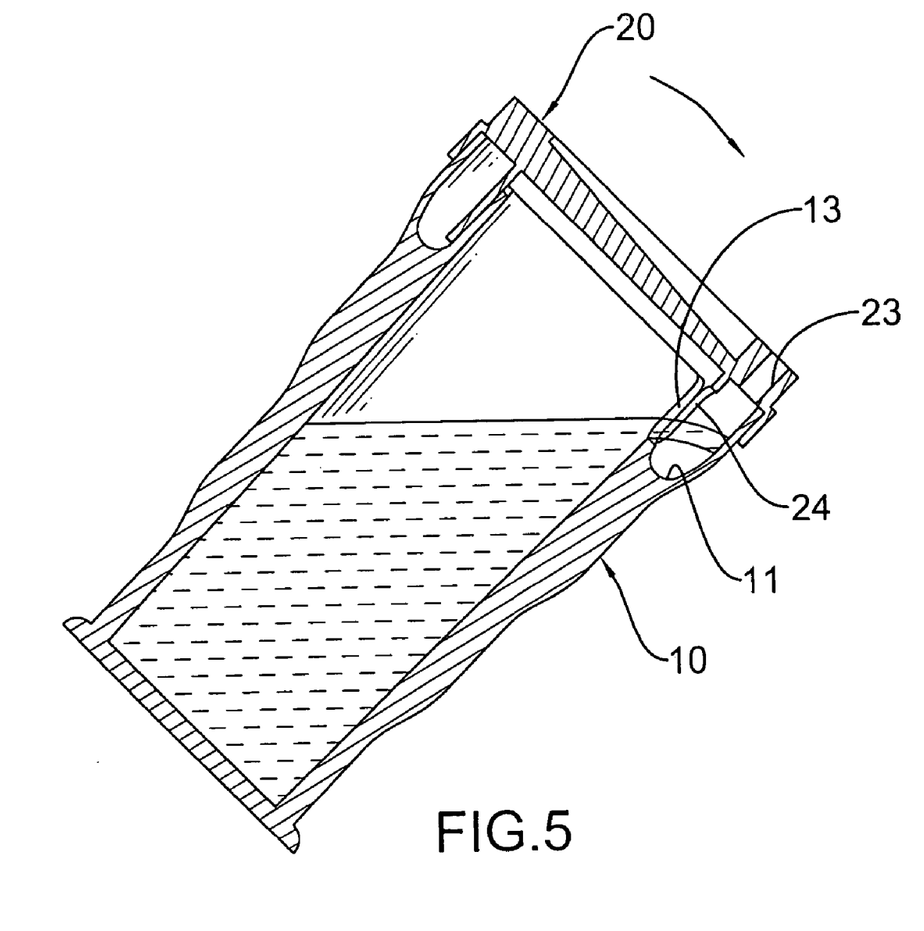
FIG. 5 is a schematic view showing the application of the cup assembly to allow the user to drink the cooled liquid in the liquid cooling chamber.

With reference to FIGS. 2, 3, 4 and 5, when the cup assembly of the present invention is in application, the user is able to rotate the lid (20) to communicate the second lid cutout (25) with the second cup cutout (14), which in turn closes the communication between the first cup cutout (13) and the first lid cutout (23). Then the user is able to tilt the cup assembly to allow a portion of the liquid inside the cup (10) to flow into a cooling compartment composed of the first chamber (11) and the second chamber (22), after which the cup assembly is tilted again to hold the cup assembly upright again. Due to the increased area in the cooling compartment when compared with the area inside the cup (10), the liquid temperature in the cooling compartment drops faster than that in the cup (10). Thereafter, the user is able to rotate the lid (20) to align the first cup cutout (13) with the first lid cutout (24), as shown in FIG. 4, to enable a user to drink the liquid in the cooling compartment from the outlet (23). Furthermore, if the user fills the first chamber (11) with water without blocking the first passage and moves the cup (10) into a freezer to freeze the water in the first chamber (11), the first chamber (11) having frozen water therein is able to provide a cooling effect to water flowing through the first passage from the interior of the cup (10).

Further, when the lid (20) is mounted on the cup (10), the limiting element (29) is first received in the longitudinal slit (17) to guide the mounting of the lid (20) in relation to the cup (10). After the limiting element (29) is reached to a bottom of the longitudinal slit (17), the limiting element (29) is able to move inside the latitudinal slit (16) when the lid (20) is rotated relative to the cup (10). As a result of the provision of the latitudinal slit (16), the rotation of the lid (20) in relation to the cup (10) is limited.

Figure 6:
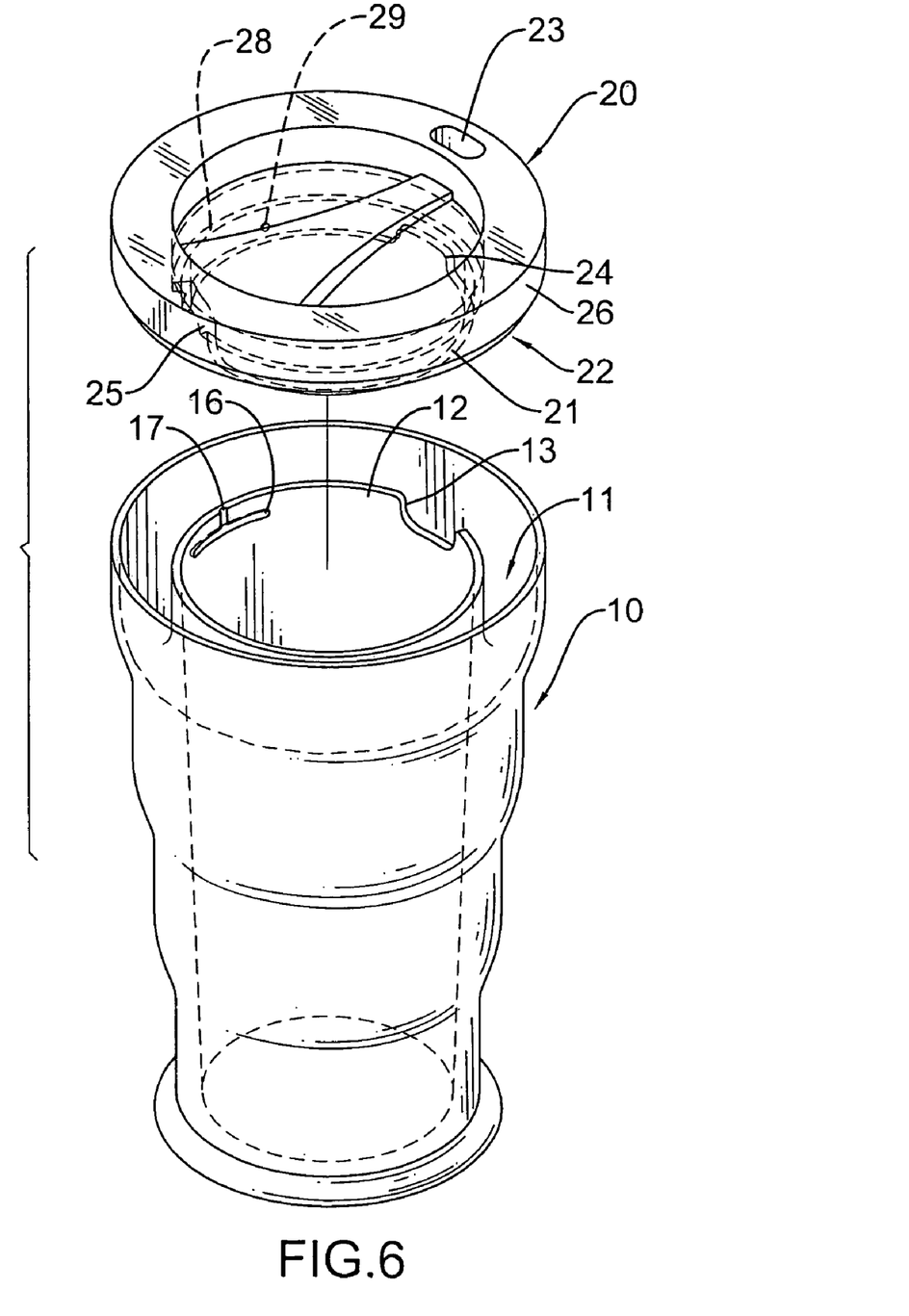
FIG. 6 is an exploded perspective view showing the second embodiment of the present invention, wherein there is provided one passage instead of two passages between the lid and the cup.
Figure 6A:
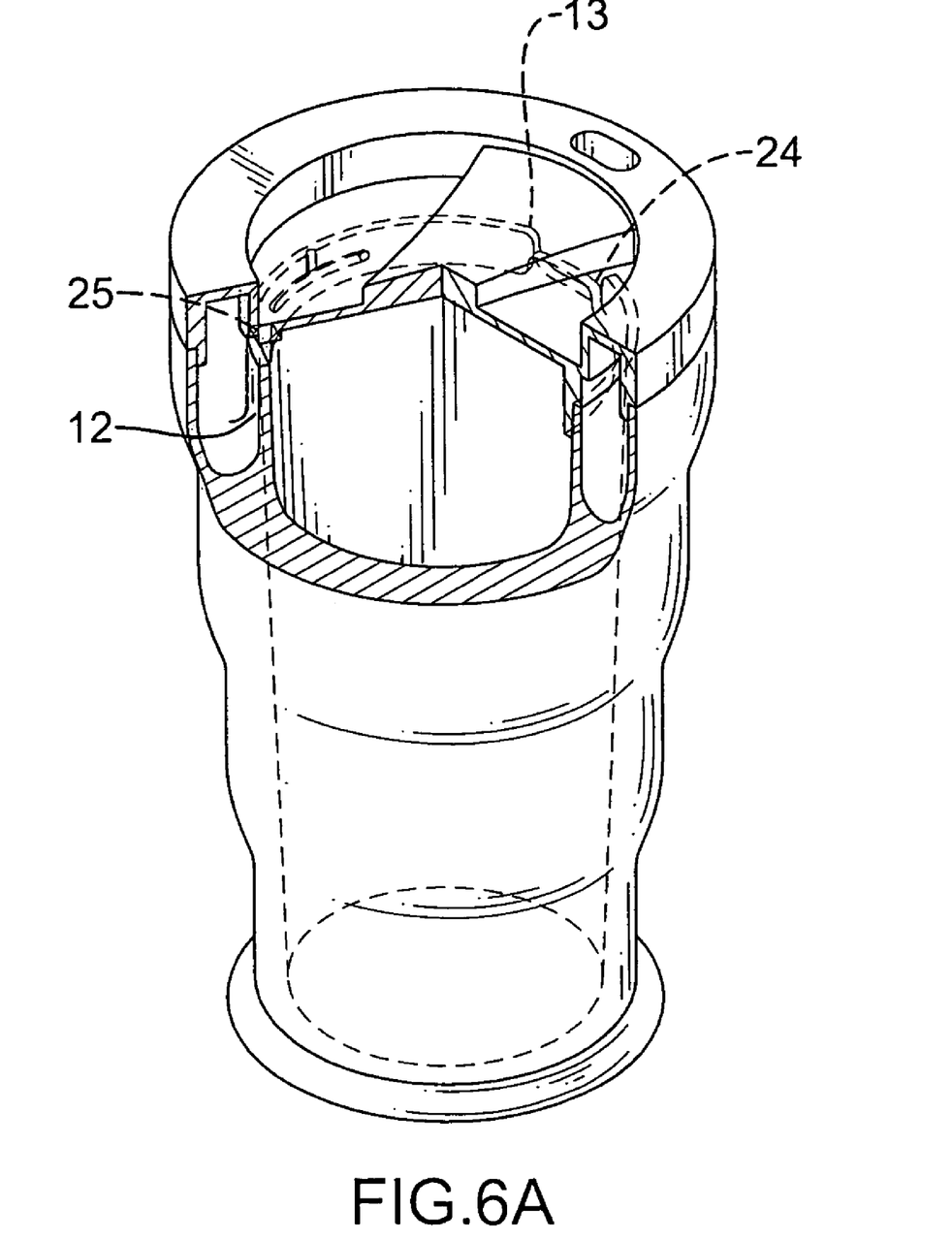
FIG. 6A is a schematic perspective view partially cross sectioned to show the corresponding relationship among the first cup cutout, the first lid cutout and the second lid cutout of the cup assembly.
Figure 7:
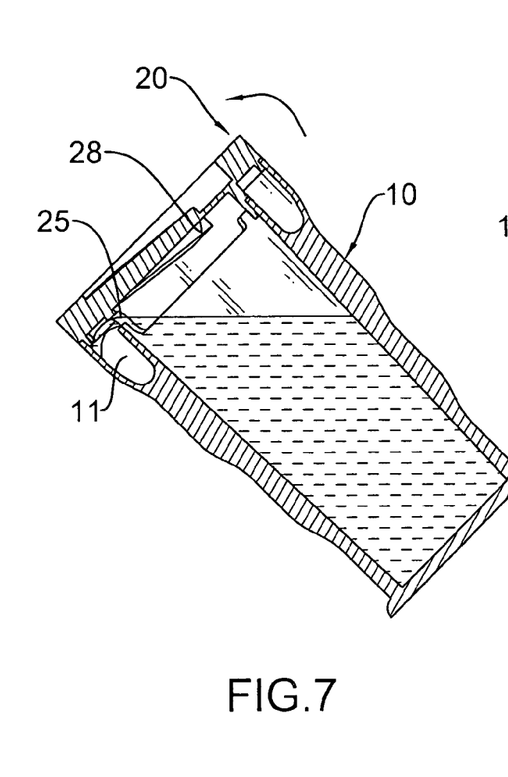
FIGS. 7 to 10 are schematic views showing the application of the second embodiment of the present invention.
Figure 8:
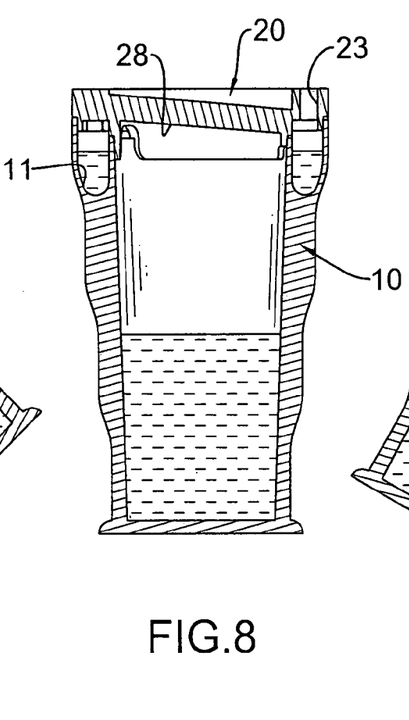

With reference to FIG. 6 and FIG. 6A, the second preferred embodiment of the present invention includes a cup (10) and a lid (20), wherein the structure of the second embodiment is substantially the same as that of the first embodiment. As consequence of the similarity, the same elements in this embodiment will be designated with the same reference numeral as those used in the first embodiment. The difference therebetween lies in that the inner wall (12) has one cutout, i.e. the first cup cutout (13), to align with the first lid cutout (24) to form a first passage. The second lid (25) has a particular depth so that after the lid (20) is mounted on top of the cup (10), a portion of the second lid cutout (25) is exposed out of the inner wall (12) to become a second passage.

Figure 9:
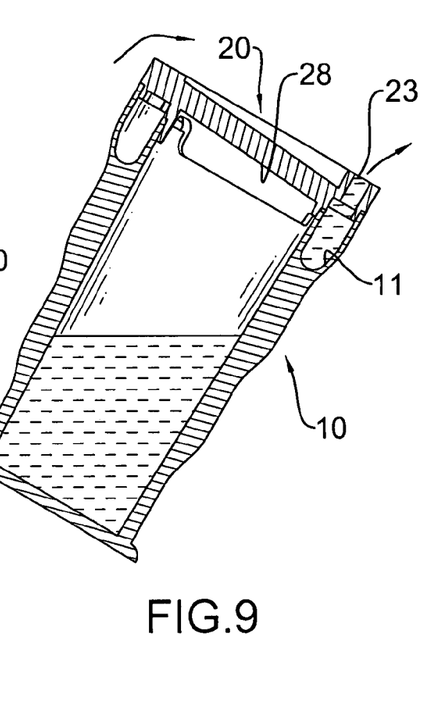
Figure 10:
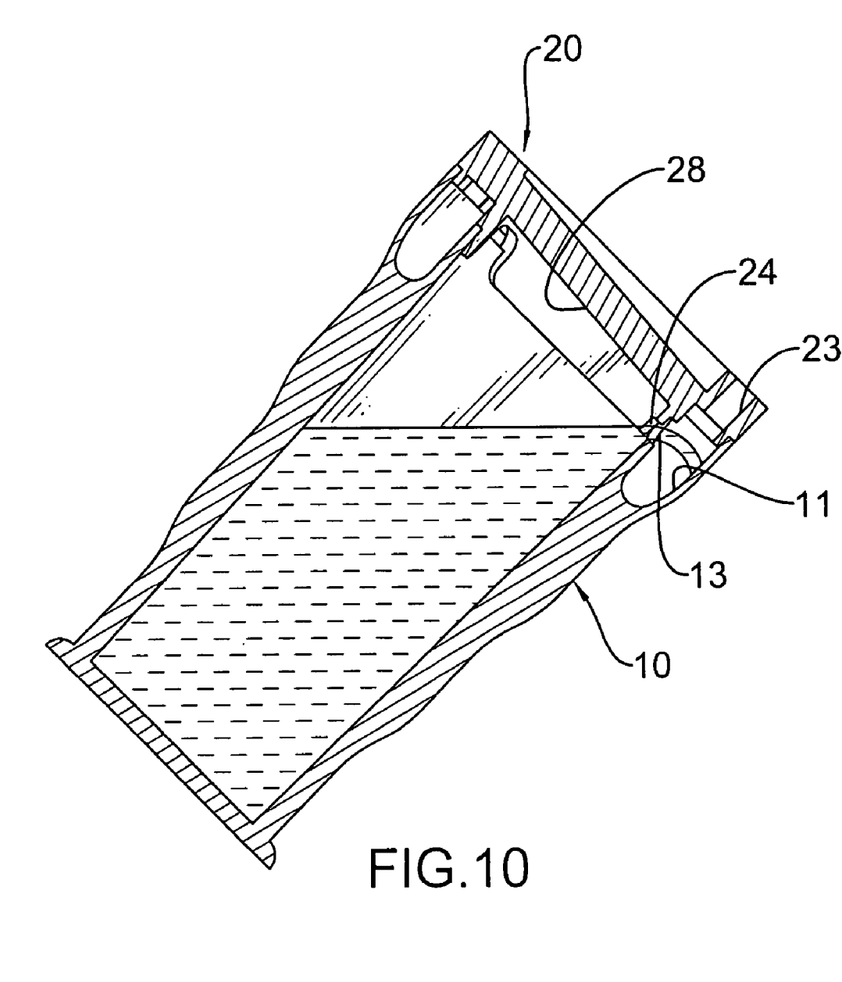

With reference to FIGS. 7, 8, 9 and 10, after the lid (20) is mounted on top of The cup (10) to close the open end of the cup (10), the user is able to rotate the lid (20) to misalign the first cup cutout (13) and the first lid cutout (24) so as to block the communication between the first passage with the outlet (23). Meanwhile, because the second lid cutout (25) has a depth exceeding the height of the inner wall (12) of the cup (10), the user is able to tilt the cup assembly to allow the hot liquid contained in the cup (10) to flow into a cooling compartment composed of the first chamber (11) and the second chamber (22), after which the cup assembly is tilted again to hold the cup assembly upright again. Due to the increased area in the cooling compartment when compared with the area inside the cup (10), the liquid's temperature in the cooling compartment drops faster than that in the cup (10). Thereafter, the user is able to rotate the lid (20) to align the first cutout (13) with the first lid cutout (24), as shown in FIGS. 9 and 10, to enable the user to drink the liquid in the cooling compartment from the outlet (23).

Figure 11:
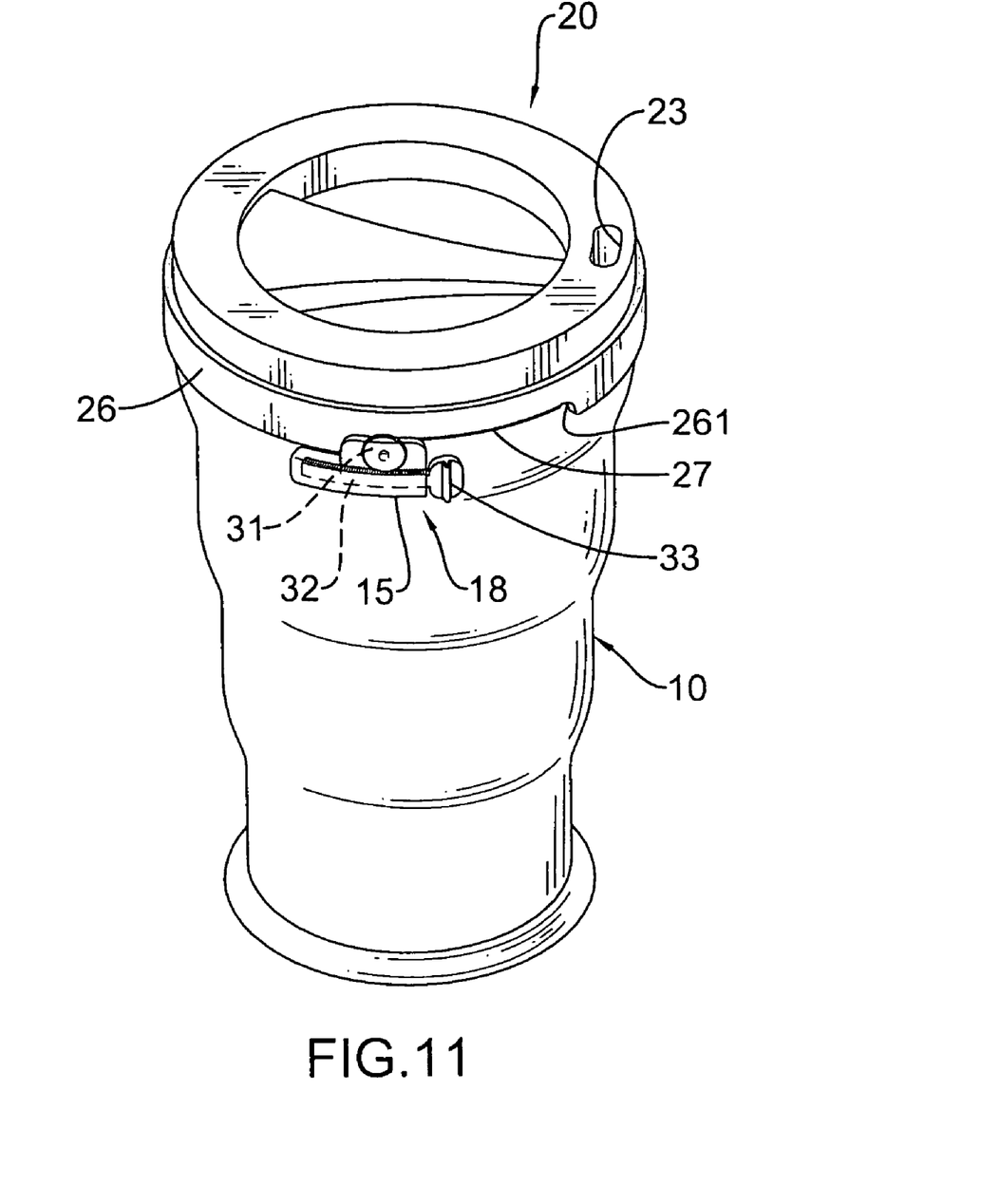
FIG. 11 is a perspective view showing the addition of a rotation restriction device to limit rotation of the lid relative to the cup.
Figure 11A:
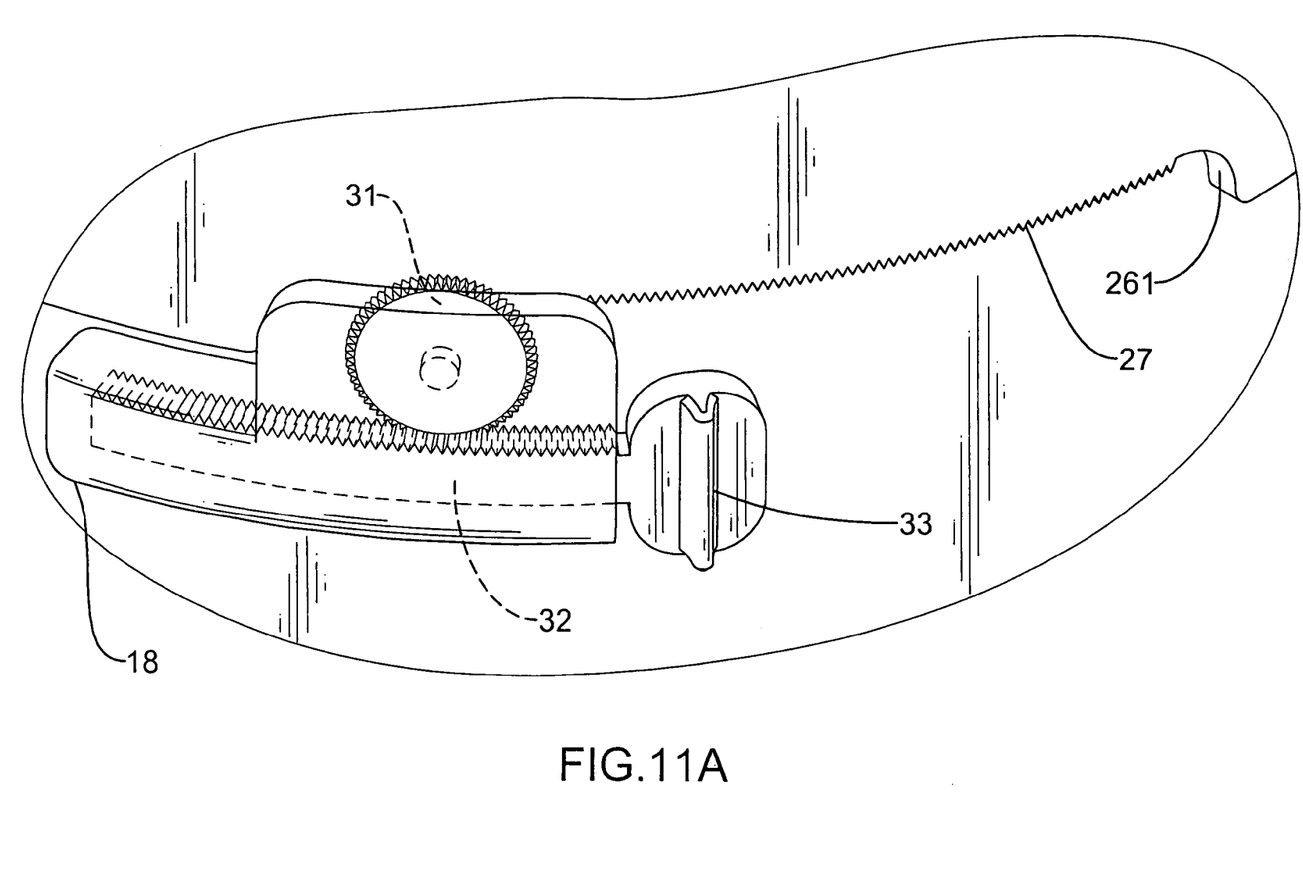
Figure 12:
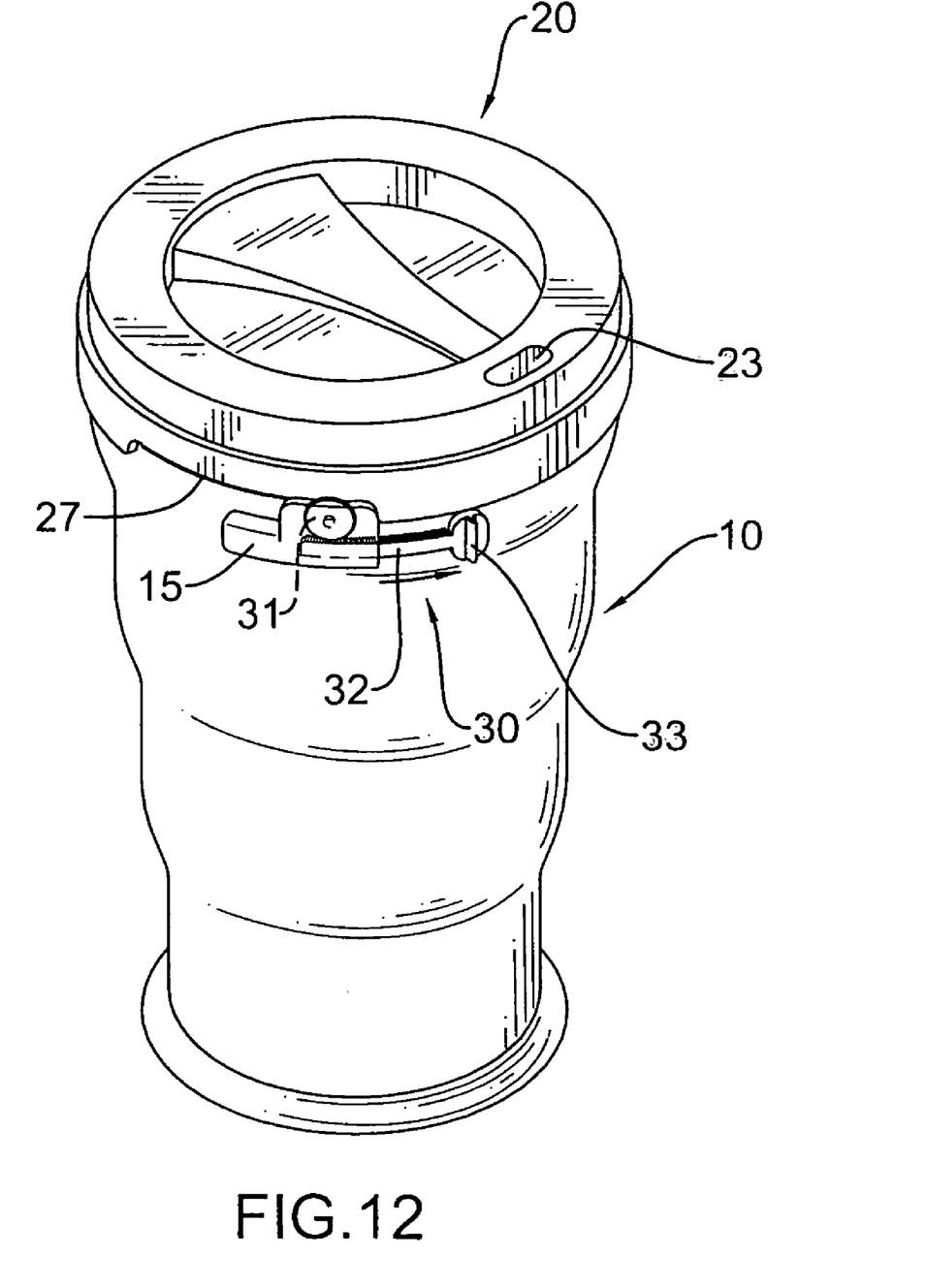
FIG. 12 is a perspective view showing the application of the rotation restriction device.

With reference to FIGS. 11, 11A and 12, the cup assembly of the present invention further has a rotation facilitating device to facilitate and limit the rotation of the lid (20) relative to the cup (10).

The rotation facilitating device includes a recess (261) defined in a peripheral edge of the outer wall (26) of the lid (20), multiple teeth (27) formed on a bottom face defining the recess (261), a gear (31) rotatably mounted on an outer periphery of the cup (10), a rack (32) slidably and movably received in a seat (18) which is rigidly mounted on the outer periphery of the cup (10) to support the rack (32) therein such that the rack (32) is able to mate with the teeth (27) of the lid (20) and a tab (33) formed on a distal end of the rack (32).

When the rotation facilitating device is used, the user is able to push or pull the tab (33) to drive the rack (32) to move relative to the seat (18). Due to the movement of the rack (32) and the alignment between the rack (32) and the teeth (27) on the lid (20), the lid (20) is driven to rotate so as to adjust the alignment of the cutouts (24,25) of the lid (20) with the cutouts (13,14) of the cup (10) (in the first embodiment) and thus the user is able to easily accomplish the adjustment to the communication or blockage of the first passage and the second passage. Furthermore, due to the length of the recess (261), the rotation of the lid (20) is limited so that the gear (31) is able to selectively engage with one of two distal ends of the recess (261) in the outer wall (26) of the lid (20). As a result, the rack (32) is prevented from falling off the seat (18).

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A cup assembly comprising:
   a cup having an inner wall formed on an interior of the cup to sandwich a first chamber with an outer periphery of the cup, the inner wall having a first cup cutout defined in a peripheral edge of the inner wall; and
   a lid being able to be mounted on top of the cup to close an open end of the cup, the lid having an inner extension extending from a bottom face of the lid to sandwich a second chamber with an outer wall which is extended from a peripheral edge of the lid, the lid having an outlet defined through the lid to communicate with the second chamber, the inner extension having a first lid cutout defined in a peripheral edge of the inner extension to correspond to and selectively align with the first cup cutout of the cup and a second lid cutout defined in the peripheral edge of the inner extension to correspond to the peripheral edge of the inner extension;
   wherein a first passage including the first cup cutout of the cup and the first lid cutout of the lid and in communication with the outlet is defined after the lid is mounted on top of the cup;

a second passage including the second lid cutout of the lid is defined after the lid is mounted on top of the cup; and a liquid cooling compartment including the first chamber and the second chamber is formed after the lid is mounted on top of the cup such that tilting the cup assembly enables the liquid cooling compartment to be filled with liquid contained in the cup when the second passage is in communication with the liquid cooling compartment and the first lid cutout of the lid is in misalignment with the first cup cutout of the cup via rotation of the lid relative to the cup thereby allowing the liquid to flow out of the outlet after communication between the first lid cutout and the first cup cutout is established via the rotation of the lid after temperature of the liquid in the liquid cooling compartment has cooled.

2. The cup assembly as claimed in claim 1, wherein the second lid cutout has a depth sufficient that after the lid is mounted on top of the cup, a portion of the second lid cutout is exposed out of the inner extension to form the second passage.

3. The cup assembly as claimed in claim 2 further comprising a guiding device formed on an outer periphery of the inner wall of the cup and a limiting element formed on the lid to correspond to the guiding device so that when the lid is mounted on top of the cup, the corresponding relationship between the guiding device and the limiting element is able to guide the lid in relation to the cup.

4. The cup assembly as claimed in claim 3, wherein the guiding device comprises a longitudinal slit in the outer periphery of the inner wall and a latitudinal slit bisecting the longitudinal slit, the limiting element is a ball mounted on an outer periphery of the inner extension to correspond to the longitudinal slit and the latitudinal slit such that after the ball is received in the longitudinal slit, the mounting of the lid on the cup is guided and when the ball is received in the latitudinal slit, rotation of the lid relative to the cup is limited due to a length of the latitudinal slit.

5. The cup assembly as claimed in claims 4 further comprising a rotation facilitating device which includes:
   multiple teeth formed on a peripheral edge of the outer wall of the lid;
   a gear rotatably mounted on the outer periphery of the cup to mate with the teeth of the lid; and
   a rack slidably and movably mounted on the cup to mate with the gear to drive the gear to rotate.

6. The cup assembly as claimed in claims 3 further comprising a rotation facilitating device which includes:
   multiple teeth formed on a peripheral edge of the outer wall of the lid;
   a gear rotatably mounted on the outer periphery of the cup to mate with the teeth of the lid; and
   a rack slidably and movably mounted on the cup to mate with the gear to drive the gear to rotate.

7. The cup assembly as claimed in claims 2 further comprising a rotation facilitating device which includes:
   multiple teeth formed on a peripheral edge of the outer wall of the lid;
   a gear rotatably mounted on the outer periphery of the cup to mate with the teeth of the lid; and
   a rack slidably and movably mounted on the cup to mate with the gear to drive the gear to rotate.

8. The cup assembly as claimed in claim 1 further comprising a guiding device formed on an outer periphery of the inner wall, of the cup and a limiting element formed on the lid to correspond to the guiding device so that when the lid is mounted on top of the cup, the corresponding relationship between the guiding device and the limiting element is able to guide the lid in relation to the cup.

9. The cup assembly as claimed in claim 8, wherein the guiding device comprises a longitudinal slit in the outer periphery of the inner wall and a latitudinal slit bisecting the longitudinal slit, the limiting element is a ball mounted on an outer periphery of the inner extension to correspond to the longitudinal slit and the latitudinal slit such that after the ball is received in the longitudinal slit, the mounting of the lid on the cup is guided and when the ball is received in the latitudinal slit, rotation of the lid relative to the cup is limited due to a length of the latitudinal slit.

10. The cup assembly as claimed in claims 9 further comprising a rotation facilitating device which includes:
    multiple teeth formed on a peripheral edge of the outer wall of the lid;
    a gear rotatably mounted on the outer periphery of the cup to mate with the teeth of the lid; and
    a rack slidably and movably mounted on the cup to mate with the gear to drive the gear to rotate.

11. The cup assembly as claimed in claims 9, wherein the cup further has a second cup cutout defined in the peripheral edge of the inner wall to correspond to and selectively align with the second lid cutout of the lid so as to form the second passage.

12. The cup assembly as claimed in claims 8 further comprising a rotation facilitating device which includes:
    multiple teeth formed on a peripheral edge of the outer wall of the lid;
    a gear rotatably mounted on the outer periphery of the cup to mate with the teeth of the lid; and
    a rack slidably and movably mounted on the cup to mate with the gear to drive the gear to rotate.

13. The cup assembly as claimed in claims 8, wherein the cup further has a second cup cutout defined in the peripheral edge of the inner wall to correspond to and selectively align with the second lid cutout of the lid so as to form the second passage.

14. The cup assembly as claimed in claims 1 further comprising a rotation facilitating device which includes:
    multiple teeth formed on a peripheral edge of the outer wall of the lid;
    a gear rotatably mounted on the outer periphery of the cup to mate with the teeth of the lid; and
    a rack slidably and movably mounted on the cup to mate with the gear to drive the gear to rotate.

15. The cup assembly as claimed in claim 14, wherein the cup further has a second cup cutout defined in the peripheral edge of the inner wall to correspond to and selectively align with the second lid cutout of the lid so as to form the second passage.

16. The cup assembly as claimed in claims 1, wherein the cup further has a second cup cutout defined in the peripheral edge of the inner wall to correspond to and selectively align with the second lid cutout of the lid so as to form the second passage.

* * * * *